UNITED STATES PATENT OFFICE.

GEORGE OLNEY, OF NEW YORK, N. Y., ASSIGNOR TO JAMES B. OLNEY AND R. NAPIER ANDERSON, OF SAME PLACE.

COMPOSITION OF MATTER.

SPECIFICATION forming part of Letters Patent No. 627,008, dated June 13, 1899.

Application filed August 1, 1898. Serial No. 687,387. (No specimens.)

*To all whom it may concern:*

Be it known that I, GEORGE OLNEY, a citizen of the United States, residing in the borough of Manhattan, in the city, county, and State of New York, have invented certain Improvements in Compositions of Matter, of which the following is a specification.

My invention relates to the general class of plastic compounds which eventually become hard or firm; and the object is to produce a compound capable of use for bowling-balls and other manufactures requiring a plastic compound which will eventually become hard and solid and which may be suitably molded into shape while still plastic.

In carrying out my invention I employ as ingredients of my compound sodium silicate, fiber, and powdered glass or other similar body substance. The proportions employed may be varied; but for making bowling-balls, which should have a certain weight proportioned to their size, I prefer to use the ingredients named in about the following proportions: sodium silicate in a plastic or liquid state, two pounds; dry paper-pulp, four ounces, and powdered glass eight ounces.

Other fibrous materials, particularly vegetable, may be employed; but I prefer to use paper-pulp, as it mixes well with the other ingredients and produces with them a very homogeneous compound.

Preferably the several ingredients of the compound will be mixed in the following manner: The powdered glass, which will be in a divided condition similar to flour by preference, is stirred into the sodium silicate, which will be a liquid-saturated solution. The paper-pulp fiber is then introduced and thoroughly incorporated with the other ingredients, the object being to produce a homogeneous mass. The mixing may be effected by hand, with a mixing-machine, or by grinding in a mill. The plastic mass should now be of a doughy consistency, and a suitable quantity of this mass may be molded into shape and then baked or cured in an oven.

Normally the compound will be of a whitish or grayish color, but it may be colored to almost any shade required with suitable earthy or metallic pigments, preferably iron oxids, ochers, and the like for red and brown colors. The coloring pigment may be mixed intimately with the ingredients before molding, and thus become thoroughly incorporated with the mass.

My composition is well suited for making various articles which are commonly made from the various woods, celluloid, and the like.

The glass being a silicate having a constitution similar to sodium silicate, but with less alkali, combines to some extent with the sodium silicate in the mass, and thus renders it homogeneous as well as very hard.

Having thus described my invention, I claim—

1. The improved composition of matter, consisting of sodium silicate, paper-pulp and powdered glass, substantially as set forth.

2. The improved composition of matter, consisting of sodium silicate, paper-pulp and powdered glass, in about the proportions of two pounds of the sodium silicate, four ounces of the dry paper-pulp, and eight ounces of the glass, substantially as set forth.

3. The improved composition of matter, consisting of sodium silicate, paper-pulp and powdered glass, in about the proportions of two pounds of the sodium silicate, four ounces of the dry paper-pulp, and eight ounces of the glass, and a desirable coloring-matter incorporated therewith, substantially as set forth.

In witness whereof I have hereunto signed my name, this 13th day of May, 1898, in the presence of two subscribing witnesses.

GEORGE OLNEY.

Witnesses:
HENRY CONNETT,
PETER A. ROSS.